(12) United States Patent
Heggelund et al.

(10) Patent No.: US 8,922,572 B2
(45) Date of Patent: Dec. 30, 2014

(54) OCCLUSION QUERIES IN GRAPHICS PROCESSING

(71) Applicant: ARM Limited, Cambridge (GB)

(72) Inventors: Frode Heggelund, Trondheim (NO); Aske Simon Christensen, Aarhus (DK); Andreas Engh-Halstvedt, Trondheim (NO)

(73) Assignee: ARM Limited, Cambridge (GB)

( * ) Notice: Subject to any disclaimer, the term of this patent is extended or adjusted under 35 U.S.C. 154(b) by 259 days.

(21) Appl. No.: 13/623,751

(22) Filed: Sep. 20, 2012

(65) Prior Publication Data

US 2013/0076762 A1 Mar. 28, 2013

(30) Foreign Application Priority Data

Sep. 22, 2011 (GB) .................................. 1116438.1

(51) Int. Cl.
| | | |
|---|---|---|
| *G06F 13/00* | (2006.01) | |
| *G06T 1/00* | (2006.01) | |
| *G06F 15/16* | (2006.01) | |
| *G06T 15/00* | (2011.01) | |
| *G09G 5/36* | (2006.01) | |
| *G06T 15/40* | (2011.01) | |
| *G06T 1/20* | (2006.01) | |
| *G06T 11/40* | (2006.01) | |

(52) U.S. Cl.
CPC ... *G06T 1/20* (2013.01); *G06T 1/00* (2013.01); *G06T 11/40* (2013.01)
USPC ........... 345/537; 345/536; 345/501; 345/502; 345/522; 345/557; 345/421

(58) Field of Classification Search
None
See application file for complete search history.

(56) References Cited

U.S. PATENT DOCUMENTS

| 5,289,576 | A | 2/1994 | Gibbons | |
|---|---|---|---|---|
| 6,259,452 | B1 * | 7/2001 | Coorg et al. | .................. 345/421 |

(Continued)

FOREIGN PATENT DOCUMENTS

| CN | 102096897 | 6/2011 |
|---|---|---|
| GB | 2452300 | 3/2009 |
| GB | 2460752 | 12/2009 |

OTHER PUBLICATIONS

GB Search Report dated Jan. 17, 2012, GB Patent Application No. GB1116438.1.

(Continued)

*Primary Examiner* — Maurice L McDowell, Jr.
*Assistant Examiner* — Donna J Ricks
(74) *Attorney, Agent, or Firm* — Vierra Magen Marcus LLP

(57) ABSTRACT

The fragment processing pipeline 10 of a graphics processing core 2 has an associated occlusion query cache 19 that is used to maintain a set of local occlusion counters 21. The occlusion query cache 19 is maintained in a local memory 3 of the graphics processing system and can communicate via an interconnect 7 with a set of master occlusion counters 22 in a main memory 5 for the graphics processing system. When an occlusion query starts, a corresponding occlusion counter 22 is initialised in the main memory 5. A corresponding local occlusion counter 21 is also provided in the occlusion query cache 19 in the local memory 3 of the graphics processor, and is used to count the results of the occlusion query. The local occlusion counter value is written back to the occlusion counter 22 for the query in the main memory 5 at the appropriate time for further processing.

19 Claims, 5 Drawing Sheets

(56) References Cited

U.S. PATENT DOCUMENTS

| | | | |
|---|---|---|---|
| 7,813,592 B2* | 10/2010 | Vetter et al. | 382/294 |
| 7,961,185 B2* | 6/2011 | Strom et al. | 345/422 |
| 8,422,825 B1* | 4/2013 | Neophytou et al. | 382/294 |
| 2005/0225670 A1* | 10/2005 | Wexler et al. | 348/441 |
| 2007/0103462 A1* | 5/2007 | Miller | 345/421 |
| 2008/0225048 A1* | 9/2008 | Bijankumar et al. | 345/421 |
| 2012/0223955 A1* | 9/2012 | Dempski et al. | 345/582 |
| 2013/0207976 A1* | 8/2013 | Jenkins | 345/420 |

OTHER PUBLICATIONS

Sekulic, GPU Gems—Chapter 29 Efficient Occlusion Culling, NVIDIA Corporation, 2004, http://http.developer.nvidia.com/GPUGems/gpugems_ch29.html.

GB Search Report dated Mar. 19, 2013, GB Patent Application No. GB1216886.0.

* cited by examiner

OCCLUSION QUERIES IN GRAPHICS PROCESSING

This application claims priority to UK Patent Application No. 1116438.1 filed Sep. 22, 2011.

BACKGROUND

1. Field

The technology described herein relates to occlusion queries in graphics processing, and in particular to advantageous methods and apparatus for performing occlusion queries, particularly in tile-based graphics processing systems.

2. Description of the Related Art

As is known in the art, occlusion queries are used in graphics processing to determine, for example, if an object to be rendered is occluded by other objects or not. This information can then be used, e.g. to modify the rendering process, e.g. by modifying the object to be rendered, to try to make it more efficient. Thus, occlusion queries may be used to measure objects to be displayed and rendered, with the rendering process then being modified based on the occlusion measurements.

The occlusion query process may use, for example, information from a previous frame, information for "true" objects of the render output, information for proxy/dummy test objects, or a combination of these.

As is known in the art, graphics processing is typically carried out by defining a set of primitives (polygons) representing an output, such as a frame to be displayed, to be rendered. Each primitive (polygon) of the render output is usually defined and represented as a set of vertices, with each vertex having associated with it a set of data values for the vertex.

The primitives representing the render output are then usually rasterised to generate a plurality of "fragments" to be processed to generate the render output. As is known in the art, these "fragments" are the discrete graphical entities on which the graphics processing operations (such as rendering) are carried out. Each fragment will correspond to a sampling point or sampling points of the render output and have associated with it the necessary data, such as red, green, blue (RGB) colour values, an alpha (transparency) value, and a depth value, to allow the fragment to be displayed. (Fragments may also be referred to as pixels, although it is not inevitably the case that a given fragment will correspond exactly to a single pixel (picture element) in the final render output that is, e.g., displayed, as post-processing, such as down-scaling, may mean that there is not a one-to-one correspondence between the entities (fragments) that the graphics processing operates on and the, e.g. display, pixels.)

The graphics fragments, once generated, undergo a number of processes to shade them to generate their final, to be displayed, appearance, such as applying textures, blending, etc. It is also usually determined whether a given fragment could be visible in (could contribute to) the final render output or not (or be occluded, e.g. by another object in the output, and so not visible (will not contribute to the final render output)). Such visibility tests can comprise, as is known in the art, a Z (depth) test, a stencil test, a frustrum visibility test, an alpha test and/or a scissor test, etc.

Occlusion queries typically count the number of fragments for a given object or objects that pass these visibility tests (at various stages in the fragment processing). Thus a typical occlusion query comprises counting the potentially visible fragments for an object or objects, and then uses that count to determine if the object(s) is visible, and/or which parts of the object are visible etc.

Occlusion queries can normally be specified as part of the graphics API. Normally the commands to the graphics processor will indicate when an occlusion query is to be started, a set of draw calls that are included in the query, and when the query is to stop. Typically the state information for or associated with a draw call, object, etc., to be rendered indicates whether the draw call, object, etc. is to contribute to a given occlusion query or not.

Occlusion queries are usually specified in graphics specifications. For example, both the Open GL and DirectX graphics specifications require and specify occlusion queries. These specifications specify two types of occlusion queries: Boolean and integer. A Boolean query should return true if any fragment of the test object or objects for the query passes the occlusion test (typically a Z (depth) or stencil test, as discussed above), i.e. could be visible, while an integer query should return the number of fragments of the test object or objects that pass the occlusion test, i.e. that could be visible.

Although Open GL and DirectX, for example, specify what is required for an occlusion query, they do not set out how the occlusion queries should be implemented. The Applicants believe therefore that there is scope for improved techniques for performing occlusion queries, e.g. of the type specified by the Open GL and DirectX specifications.

DETAILED DESCRIPTION

Figure 1:
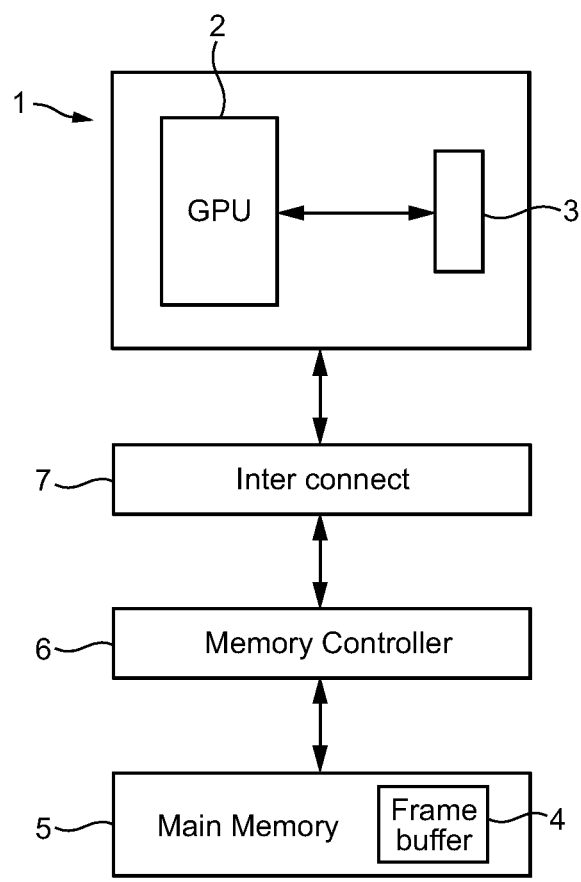
FIG. 1 shows schematically a graphics processing system that can be operated in accordance with the technology described herein.

A first embodiment of the technology described herein comprises a method of performing occlusion queries in a graphics processing system, the method comprising:

when an occlusion query is to be performed:

allocating an occlusion counter for the occlusion query in a main memory of or associated with the graphics processing system;

providing in a local memory of or associated with the graphics processing system, a local occlusion counter to be used for the respective occlusion query; and using the local occlusion counter in the local memory to count results of the occlusion query; and once the local occlusion counter in the local memory has counted results of the occlusion query, writing the counter value for the local occlusion counter from the local memory to the allocated occlusion counter for the occlusion query in a main memory of or associated with the graphics processing system.

A second embodiment of the technology described herein comprises a graphics processing system comprising:

at least one graphics processing core;

a local memory associated with the at least one graphics processing core; and a main memory of or associated with the graphics processing system; and wherein the graphics processing system is configured to, when an occlusion query is to be performed:

allocate an occlusion counter for the occlusion query in the main memory of or associated with the graphics processing system;

provide in the local memory associated with the at least one graphics processing core, a local occlusion counter to be used for the respective occlusion query;

use the local occlusion counter in the local memory to count results of the occlusion query; and once the local occlusion counter in the local memory has counted results of the occlusion query, write the counter value for the local occlusion counter from the local memory to the allocated occlusion counter for the occlusion query in the main memory of or associated with the graphics processing system.

In these embodiments, occlusion queries are implemented by using occlusion counters that are maintained in a local memory associated with the graphics processing system, with the locally counted occlusion query results then being written back to corresponding occlusion counters in main memory of the graphics processing system. In other words, "temporary", local occlusion counters are used to carry out the instant occlusion query counting for (and instead of) a "master" occlusion counter that is being maintained in main memory. As will be discussed further below, the Applicants have found that this can provide a number of advantages. It can, for example, provide a more flexible and adaptable system for implementing occlusion queries, and can facilitate the more efficient implementation of both integer and Boolean occlusion queries.

For example, the Applicants have recognised that when carrying out occlusion queries in tile-based graphics processing systems, not only is a given occlusion query for a given render output (e.g. frame) likely to be distributed across several, indeed typically all, of the tiles that the render output is to be divided into for rendering purposes, but each individual tile is likely to have plural different occlusion queries associated with it and being executed at the same time. This is because in a tile-based system, rather than being able to complete one occlusion query before starting the next (as would normally be the case in an immediate mode rendering system), the processing of all the occlusion queries for the render output must be deferred until the entire render output has been prepared, and then the render output, including the occlusion queries, will be processed in a distributed fashion, on a tile-by-tile basis (such that it is not then usually possible to complete one occlusion query before having to start another one).

(As is known in the art, in tile-based rendering, the two dimensional render output array (e.g. frame) of the rendering process (the "render target") (e.g., and typically, that will be displayed to display the scene being rendered) is sub-divided or partitioned into a plurality of smaller regions, usually referred to as "tiles", for the rendering process. The tiles (sub-regions) are each rendered separately (typically one after another). The rendered tiles (sub-regions) are then recombined to provide the complete render output array, e.g. frame for display.

Other terms that are commonly used for "tiling" and "tile based" rendering include "chunking" (the sub-regions are referred to as "chunks") and "bucket" rendering. The terms "tile" and "tiling" will be used herein for convenience, but it should be understood that these terms are intended to encompass all alternative and equivalent terms and techniques.)

Thus, when carrying out occlusion queries in a tile-based graphics processing system, there can be a need to maintain plural occlusion queries concurrently for a given tile, and across several or all of the tiles that are being processed. This can make it difficult and/or inefficient to carry out occlusion query testing in tile-based graphics processing systems.

The technology described herein addresses this by using, as described above, "local" occlusion counters, but also by writing the "local" counter values to main memory at appropriate times. The Applicants have found, as will be discussed further below, that this facilitates implementing occlusion queries, particularly in tile-based graphics processing systems, in a more efficient manner.

Thus, the technology described herein is particularly advantageous for use in tile-based graphics processing systems, and, indeed, in an embodiment, the graphics processing system is a tile-based graphics processing system (and the graphics processor(s) and graphics processing core(s) are in an embodiment tile-based graphics processors/cores).

The local occlusion counters in the local memory of or associated with the graphics processing core can be organised and configured as desired. In an embodiment the local memory includes an occlusion query cache in which the local occlusion counters are maintained (stored). In an embodiment, a check is made to see if a local occlusion counter has already been allocated to, and/or if there is a local occlusion counter available for, an occlusion query that is to be performed.

Thus, in an embodiment, the method comprises providing in a local memory of or associated with the graphics processing system, an occlusion query cache associated with the graphics processing system for storing one or more local occlusion counters to be used for respective occlusion queries; and when an occlusion query is to be performed, determining whether an occlusion counter for the query already exists in the cache or whether there is a free occlusion counter available in the cache, and, if so, allocating an occlusion counter in the cache to the occlusion query (and then using the allocated local occlusion counter to count results of the occlusion query).

Similarly, in an embodiment, the graphics processing system is configured to provide one or more local occlusion counters to be used for respective occlusion queries in an occlusion query cache in the local memory associated with the at least one graphics processing core, and is configured to, when an occlusion query is to be performed, determine whether an occlusion counter for the query already exists in the cache or whether there is a free occlusion counter available in the cache, and, if so, allocate an occlusion counter in the cache to the occlusion query (and the use the allocated local occlusion counter to count results of the occlusion query).

The local memory in which the local occlusion counters are maintained can take any suitable and desired form. It should be a local memory of or that is associated with the graphics processor in question. In an embodiment, it is a cache memory of or for the graphics processor, in an embodiment it is an L2 cache. Where the graphics processing system includes multiple graphics processors (graphics processing cores), then the multiple cores could share the same local memory (if the system is so configured), or each core could have its own separate local memory (and occlusion query cache). In an embodiment, each core has its own separate (exclusive) occlusion query cache.

The occlusion counters in the local memory (e.g. occlusion query cache) can operate as desired, e.g. depending upon the nature of the occlusion query that they are being used for (are associated with).

Thus, for example, in the case of an integer occlusion query, the counter should count each fragment that passes the occlusion test (e.g. and in an embodiment, be incremented by one each time a fragment that is associated with the query passes the occlusion test).

In the case of a Boolean query, the counter in an embodiment has one value (e.g. and in an embodiment "0") that indicates that no fragments have yet passed the occlusion test, and is then changed to another value (e.g. and in an embodiment "1"), when a fragment passes the occlusion test (and then remains at that value irrespective of how many other fragments pass the occlusion test (if the counter is maintained after the first fragment passes the test)). Thus, in the case of Boolean occlusion queries, in an embodiment the occlusion counter can have two (and only two) values, one value (which in an embodiment is "0") while the occlusion query mechanism has not counted any fragment that has passed the occlusion test, and a second value (which in an embodiment is "1") once the occlusion query mechanism has counted a fragment that has passed the occlusion test.

The occlusion test itself can take any suitable and desired form. As discussed above, in an embodiment it measures whether a fragment could be visible in (could contribute to) the final render output or not. Thus, the occlusion test could, and in an embodiment does, comprise determining whether a fragment passes one or more of, and in an embodiment all of, a depth (Z) test, a stencil test, an alpha test, a scissor test and a frustrum visibility test.

In an embodiment, the occlusion test is based on whether a fragment (as it is being processed) passes Z (depth) and stencil tests. Where both early and late depth (Z) and stencil tests may be performed, then in an embodiment the occlusion query count is based on one or other of the early and late depth (Z) and stencil tests. In an embodiment the system tries to perform the count at the early depth (Z) and stencil test stage, but can fall back to counting at the late depth (Z) and stencil test stage if necessary.

The occlusion query itself can be performed in any suitable and desired manner, for example, by occlusion testing "real" objects for a render output (e.g. complex objects (such as objects that are or will or could be made up of plural primitives) in a scene to be rendered), by injecting dummy or proxy test objects (e.g. bounding or bounded boxes that represent complex objects (e.g. "proxy" representative boxes that are or have been generated for the complex objects)) into the stream of objects to be rendered, and/or by a combination of these techniques, etc., as is known in the art. Thus, in an embodiment, the object of an occlusion query comprises a complex object (such as an object that is or will or could be made up of plural primitives) in a scene to be rendered, or a bounding or bounded box (e.g. volume) that represents a or the complex object (e.g. a "proxy" representative box (e.g. volume) that is or has been generated for the complex object).

In an embodiment the system can maintain plural local occlusion counters concurrently in the local memory (e.g. in an occlusion query cache). In an embodiment, up to the same number of local occlusion counters as there are potential draw-call states can be maintained (and in an embodiment the same number of local occlusion counters as there are draw-call states are maintained). In an embodiment at least 4 or at least 8 local counters can be maintained in the local memory (e.g. occlusion query cache) at any one time. A suitable number of local occlusion counters to maintain in the local memory is 8.

The main memory that maintains the "master" occlusion counters and that the local occlusion counter values are written to can take any suitable and desired form. For example, it may be an on-chip memory or it may be an external memory (and, indeed, may be more likely to be an external memory, as will be discussed below). Similarly, it may be dedicated memory for this purpose or it may be part of a memory that is used for other data as well. In one embodiment the main memory is a shared main system memory of or available to the graphics processing system.

The main memory can similarly in an embodiment maintain plural occlusion counters concurrently. In an embodiment it can maintain as many occlusion counters as there may be active occlusion queries for each respective graphics processor (core) that may be executing an occlusion query. Thus in an embodiment the main memory can maintain sufficient occlusion counters as would be required if each local memory maintains local occlusion counters up to or corresponding to the number of potential draw call states. Thus, for example, in an embodiment at least 8 times the number of different sets of local counters that are being maintained can be maintained in the main memory.

In an embodiment, the technology described herein can support (execute) multiple occlusion queries for a given render output (e.g. frame). In an embodiment each graphics primitive can only have one associated occlusion counter, but in an embodiment different primitives can use (point to) the same counter (i.e. a given occlusion counter can be used to count the occlusion query results for plural different primitives (e.g. which primitives relate to a complex object or a bounded or bounding box)), in an embodiment even when the primitives have differing rendering states.

The occlusion counter in the main memory can be allocated to an occlusion query in any suitable and desired manner. In an embodiment the counter in the main memory is initialised when a given occlusion query starts.

The provision of a local occlusion counter in the local memory (e.g. occlusion query cache) to an occlusion query can be performed in any desired and suitable manner. In an embodiment the local counters in the local memory (e.g. cache) are provided when a fragment relating to the occlusion query in question is created.

As discussed above, in an embodiment it is first checked whether a local counter for the occlusion query in question (the occlusion query to which the fragment relates) is already within the local memory (e.g. cache) (and if present, this counter is then used). If there is not an existing counter for the query in the local memory, then it is checked whether a new counter is available in the local memory (e.g. cache), and if so, a new counter is then allocated to the query. If there is no existing occlusion counter and no available new counter, then in an embodiment the creation of the fragment is blocked (stalled) until an occlusion counter is available in the local memory.

Whenever a new occlusion counter is allocated in the local memory, in an embodiment it is reset to zero before the fragment (occlusion) processing is started.

In an embodiment the occlusion counters are allocated by software, although other arrangements could be used, if desired.

In an embodiment, when a new local occlusion counter is allocated to an occlusion query in the local memory (e.g. the occlusion query cache), it is also determined whether a counter for the occlusion query in question has already been written to (is already present in) the main memory. This could be the case, where, for example, a previous primitive for the query has been processed and its count written to the main memory, and then, subsequently, a new primitive for that query comes to be processed.

This may also in particular be the case in a tile-based graphics processing system where, for example, a given occlusion query extends over several tiles. In this case, an occlusion counter value for one tile may be written to main memory once that tile has been finished, but a further count for that query may be triggered when the next tile, or another tile relating to that query, comes to be processed. Equally, a given occlusion query could span multiple draw calls, and in this case, the occlusion query count could be written back to the main memory after one draw call, but then be continued for a subsequent draw call or calls.

Thus, in an embodiment, when a new occlusion counter in the local memory (e.g. in the occlusion query cache) is allocated to an occlusion query, a request is also sent to the main memory to load any previous counter value for that occlusion query into the local memory. This request may be triggered as desired. For example, the request could be triggered if there is no hit on an existing occlusion-count entry. (A pointer to (the main-memory location of) each occlusion count that has been fetched could be stored to facilitate distinguishing hits from misses, if desired). Other arrangements would, of course, be possible.

Where a request is sent to main memory to load a previous counter value (if any), then the system could wait until that previous value has been loaded into the local memory (e.g. cache), before commencing the count for the new primitive or fragment, etc., using the local counter in the local memory. However, in an embodiment this is not done, and instead the new count is started in the local memory (e.g. occlusion query cache) (the new fragment(s), etc., processed and the new counter used), without waiting for the main memory request to complete. Then, when the previous counter value (if any) arrives from the main memory, in an embodiment it is applied (added to) the new counter value in the local memory to give an overall, current, counter value for the occlusion query. Thus, in an embodiment the new counter in the local memory counts a new, temporary count value until the previous value arrives from the main memory, at which point the temporary and previous values are in an embodiment combined to give an appropriate total count value in the local memory (which can then be incremented (e.g.) in the normal manner in the local memory as the occlusion query proceeds).

The loaded counter value should be combined with the temporary value in the local memory in any suitable and desired manner. Thus, in the case of an integer query, for example, the two values should be summed to give an overall, total count value for the query. For a Boolean query, the count value should be set accordingly (e.g. either to "0" or "1"), depending upon the temporary and loaded count values.

Such an arrangement where the counting using a counter in the local memory proceeds without waiting for a previous count value to be fetched into the local memory from the main memory is particularly advantageous, as it, e.g. allows the occlusion query to proceed in a more efficient manner.

Indeed, the Applicants believe that such arrangements may be new and advantageous in their own right.

Thus, a third embodiment of the technology described herein comprises a method of performing occlusion queries in a graphics processing system in which a counter for an occlusion query is maintained in a cache memory associated with the graphics processing system and written back to main memory for the graphics processing system for further processing, the method comprising:

when a new counter in the cache memory is to be allocated to an occlusion query, sending a memory request to the main memory to load a previous counter value for that occlusion query that is stored in the main memory;

using the occlusion counter in the cache memory to maintain a temporary count of the results of the occlusion query whilst waiting for the memory request to the main memory to complete; and when the previous counter value for the occlusion query from the main memory is returned in response to the memory request, combining that loaded previous counter value with the temporary value being maintained by the occlusion counter in the cache memory; and thereafter continuing to process the occlusion query using the occlusion counter in the cache memory.

A fourth embodiment of the technology described herein comprises a graphics processing system in which a counter for an occlusion query is maintained in a cache memory associated with the graphics processing system and written back to main memory for the graphics processing system for further processing, the graphics processing system further being configured to:

when a new counter in the cache memory is to be allocated to an occlusion query, send a memory request to the main memory to load a previous counter value for that occlusion query that is stored in the main memory;

use the occlusion counter in the cache memory to maintain a temporary counter of the results of the occlusion query whilst it is waiting for the memory request to the main memory to complete; and when the previous counter value for the occlusion query from the main memory is returned in response to the memory request, combine that loaded previous counter value with the temporary value being maintained by the occlusion counter in the cache memory; and thereafter continue to process the occlusion query using the occlusion counter in the cache memory.

As will be appreciated by those skilled in the art, these embodiments can include one or more of all of the features of the technology described herein, as appropriate. Thus, for example, in an embodiment the occlusion query is a Boolean or integer query.

The local counter value can be written back from the local memory (from the occlusion query cache) to the (counter in the) main memory at any suitable and desired time or stage in the process. Thus, for example, the counter value(s) could be written back to the main memory once the processing for the render output (e.g. frame) in question has been completed (i.e. only at the end of the frame) (subject to any earlier eviction from the local memory for whatever reason), and/or when all the processing for occlusion query in question has been completed.

However, in an embodiment, the system is configured to identify opportunities to write the counter value back to main memory sooner than at the end of the frame and/or the final completion of the occlusion query (and to write the counter value back to main memory if such an opportunity arises). This has the advantage of freeing-up the counter in the local memory sooner, such that it can then be re-used for another occlusion query.

The identification of opportunities to write the counter value back to main memory can be carried out in any desired and suitable manner.

In one embodiment, the use of each occlusion query counter in the local memory is monitored, and if it is determined that an occlusion counter is not currently in use, its value is written back to main memory, and the local counter then (and thus) made available for re-allocation to another occlusion query. In an embodiment this is done by associating a usage counter with each occlusion counter that is in use in the local memory, with the usage counter value then indicating whether its associated occlusion counter is currently in use or not. Thus, in one embodiment, one or more, and in an embodiment each, occlusion query counter in the local memory can and in an embodiment does have a usage counter associated with it (maintained for it), to monitor whether the occlusion counter is in use or not. Other arrangements would, of course, be possible.

Such usage counters can be configured to operate as desired. For example, and in an embodiment, they could count the number of "active" fragments for the occlusion query in question that are in the graphics processing pipeline (such that when this count falls to zero, the occlusion counter can be considered to be no longer in use).

Monitoring the usage of the occlusion counters in this way may be particularly appropriate where the occlusion query is an integer query, i.e. such that a running total of the numbers of potentially visible fragments etc., is to be maintained.

The Applicants have further recognised that in the case of a Boolean occlusion query (i.e. a query where the query is met once one fragment passes the occlusion (e.g. the z and stencil) test, then the writing back of the counter value to main memory can happen immediately when the query is met, and the count then stopped (this is because the Boolean query only has to be met once: any further counts are irrelevant). Thus, in an embodiment, where the occlusion query is a Boolean query, once the query has been met (i.e. a fragment for the query has passed the occlusion test), the local occlusion counter value is then written to main memory, and the occlusion counter in the local memory is made available for use for other occlusion queries.

The results of the occlusion queries that are written to the main memory are in an embodiment appropriately processed, e.g. once the query has finally been completed. Thus, in an embodiment the counter values written to the main memory are used to process and/or analyse the occlusion query or queries. The occlusion query values can be used as desired (and as specified, e.g. in the graphics specification in question). In an embodiment, the results are read and analysed in software (e.g. by the application (e.g. game) that is triggering the use of the graphics processor), and in an embodiment this can be done before the next render output (e.g. frame) is rendered (as then the results of the current output (e.g. frame) can be applied to the next render output).

The results of the occlusion queries (and the occlusion counts) are in an embodiment used to modify and/or control the rendering process. In an embodiment they are used to determine (and control) whether a given object in a frame to be rendered should be drawn (i.e. should be rendered so as to contribute to the render output) or not. Thus in an embodiment the occlusion query results are used to assess whether a part or parts of the content to be rendered are visible in the render output or not, and to then determine whether to intentionally occlude that content from a subsequent (future) render output (frame or frames) or not.

In an embodiment, the results of an occlusion query are used to determine whether an object in a render output (e.g. frame) to be rendered (such as, and in an embodiment a "complex" object) is visible and/or which parts of the object are visible. If it is then determined that the object is not visible in a particular frame (render output), then in an embodiment subsequent rendering operations in respect of that object are reduced or avoided. Thus, in an embodiment, the results of the occlusion query are used to reduce or avoid subsequent rendering operations.

In an embodiment, if the occlusion query count (i.e. the number of potentially visible fragments) for an object rises above a threshold value, then it is determined that the object is visible. Similarly, if the occlusion query count for an object falls below a threshold value, then in an embodiment it is determined that the object is not visible In an embodiment, if it is determined that an object is not visible in a particular frame based on the occlusion query (result (e.g. count)), then in an embodiment the original object is replaced with a bounding box (e.g. volume) that represents the original object for the purposes of rendering the next frame (the next render output). In an embodiment, the bounding box is a simple representation of the original object that is easier for the graphics processing system to process than the original (e.g. complex) object that it represents.

In an embodiment, the state information for or associated with the bounding box is set so that the bounding volume does not contribute to the render output. However, the bounding box may be, and in an embodiment is, subjected to an occlusion query. If it is then determined from that occlusion query (result (e.g. count)) that the bounding box is potentially visible in a particular frame (e.g., and in an embodiment if the occlusion count for the bounding box rises above a threshold), then in an embodiment the bounding box is replaced with the complex object that it represents for the purposes of rendering the next frame, and so on.

Thus, the results of the occlusion queries are in an embodiment used to determine or predict when a part or parts (e.g. a complex object or objects) of a frame or other output to be rendered will (or could) be not be visible (i.e. occluded), and/or when the part or parts will (or could) be visible, in the render output. Subsequent rendering operations on the part or parts (object or objects) are in an embodiment then reduced or avoided, accordingly, for example, and in an embodiment by replacing (substituting) an occluded complex object with a bounding box (e.g. volume) that represents the complex object when appropriate.

Such arrangements are particularly advantageous since, as will be appreciated by those skilled in the art, they can allow the rendering process to proceed in a more efficient manner.

The technology described herein as described above can be used for any and all forms and types of occlusion queries, such as, in particular, and in an embodiment, integer occlusion queries and Boolean occlusion queries. It would also be possible to use the technology described herein for, for example, "threshold" occlusion queries where the query is met if the occlusion query count exceeds a certain value. Such a query could be thought of as being like a Boolean query, but with a threshold value greater that 1. In this case, the query could be performed in the manner of an integer occlusion query as discussed above until the threshold count value is reached, and then treated as (and processed as) a Boolean occlusion query thereafter (once the threshold has been exceeded). This may require, e.g., maintaining both an integer counter and a Boolean counter for the query in the main memory.

The Applicants have recognised that depending upon the nature of the occlusion query, a number of further optimisations and arrangements would be possible. These arrangements will now be described.

In the case of integer occlusion queries, for example, in an embodiment the local memory occlusion counter, as discussed above, counts the number of fragments passing the occlusion test. Furthermore, when a previous counter value is loaded from the main memory, in an embodiment that value is simply added to the temporary, local counter value in the local memory. Then, when it comes to writing the counter value back to the main memory, in an embodiment that is done once the usage counter for the occlusion counter shows that the occlusion counter is not in use (e.g. reaches zero) and any required previous counter value has been loaded. In an embodiment occlusion counters with the value 0 are not written back.

In the case where there is a single graphics processing core performing an integer occlusion query, then a single occlusion counter can be maintained for the query for the core. However, the Applicants have recognised that where multiple graphics processing cores are processing a given occlusion query in parallel, then other arrangements may be possible or required. For example, if the graphics processing system has a coherent memory system, then it may be possible to use read/modify/write processes of the memory system to allow multiple graphics processing cores to use the same counter (counter value memory location) in the main memory for a given occlusion query. However, for other memory systems, this may not be so possible.

Thus, in one embodiment, where the graphics processing system includes multiple processing cores, each able to operate on the same occlusion query, then at least in the case of an integer occlusion query, each processing core has its own, separate set of local occlusion counters, and, in particular, in an embodiment has its own count value (and counter) for a given occlusion query in the main memory. This then avoids any problems with different cores trying to write to the same counter (location) in the main memory, for example. In this arrangement, in an embodiment the individual cores' counter values for a given occlusion query in the main memory are accordingly consolidated (summed) at the appropriate time to provide the overall occlusion query result. This may be done, e.g. in software, although other arrangements would, of course, be possible.

Variations on these arrangements would be possible, if desired. For example, if groups of some (but not all) of the processor cores share coherent memory, then each such group of cores could share a common set of occlusion counters, with the results for each different group of cores then being accumulated to provide the overall occlusion query result.

In the case of Boolean occlusion queries, where a single graphics processing core is performing the query, in an embodiment there is again a single counter for the query for the core. In the case of a multi-core system, each core could have its own separate set of counters in the main memory, but in an embodiment, all the cores use the same counter in the main memory for a given Boolean occlusion query. This is more efficient, and, as the Applicants have recognised, is possible for Boolean occlusion queries for all memory systems (not just coherent ones), as the Boolean counter need only take two different values (as discussed above).

Thus, in an embodiment, where the graphics processing system includes multiple processing cores (that can each process a given occlusion query simultaneously), the multiple processing cores share a single counter in the main memory for a given Boolean occlusion query (i.e. where the multiple processing cores are to execute a Boolean occlusion query, they share the same counter (memory location) in the main memory for that query).

To further facilitate such sharing of the same counter, in an embodiment any Boolean counter value in the local memory is only written back to the counter in the main memory when the counter value is the value that indicates a fragment has passed the occlusion test (i.e. "1" in the example discussed above). This helps to ensure that all the cores will only ever try to write the same value to the counter in the main memory, such that if multiple cores try to write to the same occlusion counter in the main memory, all those writes will have the same value (and so cannot, e.g., contradict or conflict with each other).

Thus, where a Boolean occlusion query is being processed, in an embodiment the counter value that indicates that no fragment has yet passed the occlusion test is never written back to the counter in main memory (i.e. in the above example, where 0 indicates this, Boolean counters with the value 0 are not written back to the main memory; only non-zero counters are written back by the main memory). Furthermore, as discussed above, a "local" Boolean counter that has a non-zero value (i.e. that indicates that a fragment has passed the occlusion test) in an embodiment is written back to the counter in main memory immediately upon its change to a non-zero value (i.e. in an embodiment the change to the non-zero value that indicates that a fragment has passed the occlusion test triggers the writing back of the value to the (counter in) main memory)).

In the case of a Boolean occlusion query, the Applicants have further recognised that once the query has been met, i.e. a fragment has passed the occlusion test, there is then no need to continue testing further objects, and fragments, etc., in relation to that occlusion query. Moreover, the Applicants have recognised that in tile-based graphics processing systems in particular, a given object, such as a primitive, that trips (meets) the Boolean occlusion query may fall to be processed in respect of that query multiple times, e.g. once for each tile that it falls within, even though, as discussed above, such multiple processing will not contribute anything more to the result of the occlusion query.

In view of this, in an embodiment when performing a Boolean occlusion query, once the query has been met, it is in an embodiment then determined whether there is any later processing in relation to that query that need no longer be performed, and if so, that later processing is omitted. The later processing could, e.g. relate to the later processing of objects for the query, and/or, for example, to the processing of fragments in respect of an object that has tripped the query. For example, as discussed above, if a test object trips the Boolean query for a given tile, it may then not be necessary to process that test object for any other tiles, and thus the processing of the test object for any other tiles (after the query has tripped (been met)) is in an embodiment omitted and/or aborted (as appropriate). This can help to avoid any unnecessary processing in relation to the occlusion query, thereby making the process more efficient, use less power, etc.

In these arrangements, the fact that the Boolean query has been met will be indicated by the occlusion counter having or taking the appropriate value (e.g. 1). Thus, for example, if a primitive associated with a Boolean query is to be processed, the occlusion counter for that query can be checked to see if the query has already been met or not (and the primitive processed or not, accordingly). Similarly, if during processing of a primitive, the Boolean query is met, then that can trigger no longer producing new fragments for that primitive.

As well as determining that the Boolean query has been met, in an embodiment it is also determined whether the graphics entity (e.g. primitive, object, or fragment) in question should otherwise be processed anyway, e.g. because it is still needed to contribute to the render output. This could be the case, e.g., where the graphics entity, e.g., primitive, is or relates to a "true" object of the render output and not just a dummy "test" object for the purpose of the occlusion query. In this case, although the object may not affect the Boolean occlusion query, it could still contribute to the render output, and so should still be processed, even though the Boolean occlusion query has been met.

Thus, in an embodiment, when a Boolean occlusion query has been met it is also checked whether the graphics entity in question (e.g. the primitive, and/or fragments, etc.) could need still to be processed for other reasons or not, and then the entity is only not processed if it does not need still to be processed for another reason. In other words, in an embodiment it is checked if the graphics entity contributes only to the occlusion query (in which case it need not be processed once the query is met) or not (in which case it will still need to be processed even after the query is met).

Such a check can be carried out in any suitable and desired form, and will depend, e.g. on the nature of the graphics processing system in question. In an embodiment it is checked whether the graphics entity, e.g., primitive, is intended to contribute to the render output (e.g. frame buffer) or has side effects, or not. In an embodiment, the render state for the entity is checked. In an embodiment the render state is checked to see if the graphics entity has side effects or not, and whether colour, depth and stencil buffer writes are enabled for the entity or not (i.e. whether the entity will contribute to any of the colour, depth or stencil buffers). If the graphics entity, e.g. primitive, will not contribute to (is not intended to contribute to) any of the colour, depth and stencil buffers, and it does not produce (is not intended to produce) shader side effects, then it may be discarded (not processed) if the Boolean query has already been met (but not otherwise).

Thus, in an embodiment, if a graphics entity to be processed is associated with a Boolean occlusion query, it is determined whether the query has been met, and if it has, it is then determined whether the entity still needs to be processed or not, and if it does not, the entity is not processed.

The graphics entity in this case could be, e.g., and in one embodiment is, a graphics primitive that is associated with the occlusion query. Thus, in one embodiment if a graphics primitive to be processed is associated with a Boolean occlusion query, it is determined whether the query has been met, and if it has, it is then determined whether the primitive still needs to be processed or not, and if it does not, the primitive is not processed. This will then allow the unnecessary processing of primitives after a Boolean occlusion query has been met to be avoided.

The graphics entity could also or instead, and in an embodiment also, be a graphics fragment. In this case, the system could then operate to avoid producing and/or processing any more graphics fragments for a primitive that trips the Boolean query. Thus, in an embodiment if a graphics fragment to be processed is associated with a Boolean occlusion query, it is determined whether the query has been met, and if it has, it is then determined whether the fragment still needs to be processed or not, and if it does not, the fragment is not processed.

This latter arrangement could also be extended to stop the processing of any already produced (but unfinished) fragments (e.g. that are already in the graphics processing pipeline), if the graphics processing system supports the ability to stop the processing of fragments that are already in the pipeline.

This could also be, and in an embodiment is, extended to any other fragments in the pipeline that relate to the query, such as fragments of other, earlier primitives relating to the query. Thus, in an embodiment the processing of all already produced fragments relating to a Boolean occlusion query that is met is stopped, where that is possible.

It can be seen from the above that these embodiments can provide a system for implementing Boolean occlusion queries in a particularly efficient and effective manner, particularly for tile-based graphics processors. It is also believed that such arrangements may be new and advantageous in their own right.

Thus, a fifth embodiment of the technology described herein comprises a method of operating a graphics processing system when performing a Boolean occlusion query, the method comprising: when a graphics entity relating to the Boolean occlusion query is to be processed, determining whether the Boolean occlusion query has already been met, and if it has, then determining whether the graphics entity still needs otherwise to be processed or not, and if it is determined that the graphics entity does not need otherwise to be processed, stopping processing of the graphics entity.

A sixth embodiment of the technology described herein comprises a graphics processing system comprising a processor configured to perform a Boolean occlusion query, and wherein the processor is further configured to: when a graphics entity relating to a Boolean occlusion query is to be processed, determine whether the Boolean occlusion query has already been met, and if it has, then determine whether the graphics entity still needs otherwise to be processed or not, and if it is determined that the graphics entity does not need otherwise to be processed, stop processing of the graphics entity.

As will be appreciated by those skilled in the art, these embodiments can include any one or more or all of the features of the technology described herein, as appropriate. Thus, for example, in an embodiment the graphics entity to be processed is one of a primitive and a fragment to be processed, the fact that the Boolean query has been met is in an embodiment determined by checking the value of an occlusion counter associated with the query, the determination of whether the graphics entity still needs to be processed or not is in an embodiment based on whether the graphics entity could otherwise contribute to the render output, the results of the occlusion queries may be used to modify the rendering process, etc. Similarly, in an embodiment the graphics processing system uses an occlusion counter arrangement of the type discussed above.

In embodiments, the fact that the Boolean occlusion query has been met is determined from the occlusion counter value. This could use just the occlusion counter value for the counter in the local memory, but in an embodiment any occlusion counter value for the occlusion query in the main memory is considered as well. In this latter case, the stopping of the processing (if that is possible) may need to wait for the counter value from the main memory to be loaded and checked (and may be triggered by the loading of the counter value from the main memory).

Thus, in an embodiment, when a graphics entity relating to a Boolean occlusion query is to be processed, if the counter value for that query in the local memory (e.g. in the occlusion query cache) shows that the query has already been met, it is then checked if the graphics entity still needs to be processed or not (and the process proceeds accordingly). Similarly, if the value of a counter that is loaded from main memory shows that a Boolean query has been met, in an embodiment it is then checked if the graphics entity still needs to be processed or not (and the process proceeds accordingly). Again, if the local counter value for a Boolean occlusion query changes to the state that indicates that the query has been met, in an embodiment that change then triggers a check to see if the (current) graphics entity still needs to be processed or not (and in an embodiment the processing for the entity is then stopped, if it is possible to do that).

As discussed above, once a Boolean query has been determined as having been met (i.e. its counter value is found to be, or changes to be, in the state that indicates that), in an embodiment it is also determined whether the processing of any graphics entities (such as fragments) that are already being processed (e.g. that are already in the graphics processing pipeline) can be aborted as well (and the processing of those entities aborted, if it is possible to do that).

The above arrangements for use with Boolean occlusion queries can equally be used when some other occlusion query threshold value is met (as discussed above) (and the technology described herein encompasses and extends to such arrangements).

Various other changes and modifications to the technology described herein would be possible, if desired. For example, the occlusion counters could be stored in the state of the primitives instead of the state of the "system" (but it may then be necessary to add the counters from the different primitives together to give the overall query result).

Also, other optimisations, processing etc., that the graphics processing system is to perform should be made compatible with the occlusion query processing of the technology described herein, as desired and necessary, and where used.

The technology described herein can be used irrespective of the form of output that the graphics processing system may be providing. Thus, for example, it may be used where render output intended to form an image for display (e.g. on a screen or printer) (and in one embodiment this is the case). However, the technology described herein may also be used where the render output is not intended for display, for example where the render output is a texture that the graphics processing system is being used to generate (e.g. in "render to texture" operation), or, indeed, where the output the graphics processing system is being used to generate is any other form of data array.

The various functions of the technology described herein can be carried out in any desired and suitable manner. For example, the functions of the technology described herein can be implemented in hardware or software, as desired. Thus, for example, the various functional elements and "means" of the technology described herein may comprise a suitable processor or processors, controller or controllers, functional units, circuitry, processing circuitry, processing logic, microprocessor arrangements, etc., that are operable to and/or configured to perform the various functions, etc., such as appropriately dedicated hardware elements and/or processing circuitry that operate, and/or programmable hardware elements and/or processing circuitry that can be programmed to operate, in the desired manner.

It should also be noted here that, as will be appreciated by those skilled in the art, the various functions, etc., of the technology described herein may be duplicated and/or carried out in parallel on a given processor. Indeed, as discussed above, the technology described herein, in embodiments at least may be particularly suited to multi-core (multi-processor) arrangements and systems.

The technology described herein is applicable to any suitable form or configuration of graphics processing system, graphics processor, and renderer, such as, and in an embodiment, processors having a "pipelined" rendering arrangement. It is particularly applicable to tile-based graphics processors and graphics processing systems, and to multi-core graphics processing systems. Thus, in an embodiment, the graphics processing system is a tile-based graphics processing system. Similarly, in an embodiment, the graphics processing system is a multi-core system (i.e. includes plural graphics processing cores).

The technology described herein accordingly extends to a graphics processor and a graphics processing platform including the apparatus of, or operated in accordance with the method of, any one or more of the embodiments of the technology described herein. Subject to any hardware necessary to carry out the specific functions discussed above, such a graphics processor can otherwise include any one or more or all of the usual functional units, etc., that graphics processors include.

It will also be appreciated by those skilled in the art that all of the described embodiments can include, as appropriate, any one or more or all of the features described herein.

The methods in accordance with the technology described herein may be implemented at least partially using software e.g. computer programs. It will thus be seen that when viewed from further aspects the technology described herein provides computer software specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or microprocessor system comprising data processing means causes in conjunction with said data processing means said processor, renderer or system to carry out the steps of the methods of the technology described herein. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the methods described herein need be carried out by computer software and thus from a further broad aspect the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible medium, such as a non-transitory computer readable medium, for example, diskette, CD ROM, ROM, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

A number of embodiments will now be described by way of example only and with reference to the accompanying drawings.

Like reference numerals are used for like features throughout the Figures, where appropriate.

As discussed above, the technology described herein relates to the carrying out of occlusion queries in graphics processing systems. As is known in the art, occlusion queries are used to try to determine whether a given object to be rendered, for example, will be visible in the final render output, and can be used, for example, to determine whether an object or any parts of an object do not need to be processed (and so can, e.g., be culled at an early stage in the rendering process, thereby increasing its efficiency).

Figure 2:
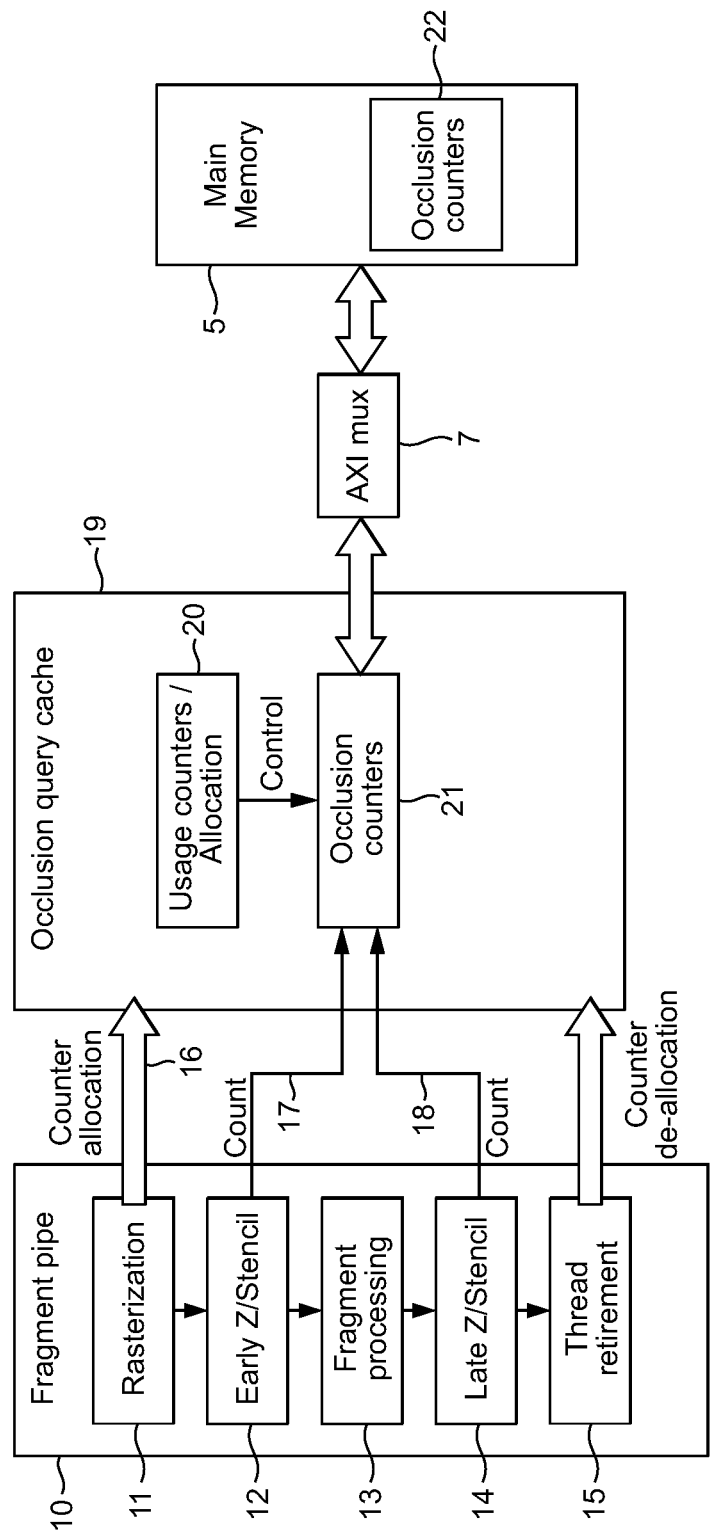
FIG. 2 shows schematically the arrangement of the occlusion query cache in an embodiment.

FIGS. 1 and 2 show schematically a first embodiment of a graphics processing system.

These figures show the main elements of the graphics processing system that are relevant to the operation of the present embodiment. As will be appreciated by those skilled in the art there may be other elements of the graphics processing system that are not illustrated in FIGS. 1 and 2. It should also be noted here that these Figures are only schematic, and that, for example, in practice the shown functional units may share significant hardware circuits, even though they are shown schematically as separate stages in these Figures.

The graphics processing system 1 includes, as shown in FIG. 1, a tile-based graphics processing core or graphics processing unit (GPU) 2, which, as is known in the art, produces tiles of a render output data array, such as an output frame to be generated. The output data array may, as is known in the art, typically be an output frame intended for display on a display device, such as a screen or printer, but may also, for example, comprise a "render to texture" output of the graphics processor, etc.

The system also includes a local, cache memory 3 that is useable by the GPU 2.

As is known in the art, in such an arrangement, once a tile has been generated by the graphics processor 2, it would then normally be written to a frame buffer 4 in a main memory 5 (which memory may be DDR-SDRAM) associated with the graphics processing system 1 via an interconnect 7 which is connected to a memory controller 6. Sometime later the frame buffer will, e.g., be read by a display controller and output to the display.

In the present embodiment, the graphics processing system 1, maintains an occlusion query cache in the local memory 3 associated with the graphics processor 2, that contains local copies of occlusion counters for occlusion queries that the graphics processor 1 is executing. These local occlusion counter values are written back to occlusion counters for the queries in the main memory 5 at the appropriate time, as will be discussed further below.

FIG. 2 shows the arrangement of the occlusion query cache of the present embodiment in more detail.

Thus, FIG. 2 shows schematically the fragment processing pipeline 10 of the graphics processing core 2 together with its associated occlusion query cache 19 that will be present in the local memory 3.

As shown in FIG. 2, the fragment processing pipeline 10 of the graphics processor 1 includes a number of stages, as is known in the art, including a rasterisation stage 11, an early Z (depth) and stencil test stage 12, a fragment processing stage 13, a late Z (depth) and stencil test stage 14, and a fragment retirement stage 15.

The rasterisation stage 11 operates, as is known in the art, to rasterise the primitives making up the render output (e.g. the image to be displayed) into individual graphics fragments for processing. To do this, the rasteriser 11 receives graphics primitives for rendering, rasterises the primitives to sampling points and generates graphics fragments having appropriate positions (representing appropriate sampling positions) for rendering the primitives, as is known in the art.

The early Z/stencil stage 12 performs, is known in the art, a Z (depth) test and a stencil test, on fragments it receives from the rasteriser 11, to see if any fragments can be discarded at this stage.

The fragment processing stage 13 performs the appropriate fragment processing operations on the fragments that pass the early Z and stencil tests, so as to process the fragments to generate the appropriate fragment data, etc., for the render output (e.g. for display of the fragments), as is known in the art. This fragment processing can include, for example, applying a number of rendering or shading operations, such as texture mapping, fogging, blending, etc., to the graphics fragments to generate the appropriate fragment data.

The late Z/stencil test stage 14 subjects the processed fragments to a further Z test and stencil test, as is known in the art.

The data for fragments that pass these tests is then stored, again as is known in the art, in tile buffers (not shown) in the local memory 3 of the graphics processing system for subsequent processing. The tile buffers store, as is known in the art, an array of fragment data that represents part of the render output (e.g. image to be displayed). Once each tile has been processed, its data is exported to the main memory 5 (e.g. to the frame buffer 4 in the main memory 5) for storage, and the next tile is then processed, and so on, until sufficient tiles have been processed to generate the entire render output (e.g. frame (image) to be displayed).

The fragment retirement stage 15 operates to retire fragments whose processing has been completed.

Other arrangements for the fragment processing pipeline 10 would, of course, be possible.

As shown in FIG. 2, graphics processing core 2 has an associated occlusion query cache 19 that is used to maintain a set of local occlusion counters 21. The occlusion query cache 19 is maintained in the local memory 3 of the graphics processing system and can communicate via the interconnect 7 (which may, e.g., be an AXI bus) with a set of "master" occlusion counters 22 in the main memory 5 for the graphics processing system.

As also shown in FIG. 2, the occlusion query cache 19, as well as maintaining the local versions 21 of the occlusion counters, also maintains a set of usage counters 20 which are associated with the local occlusion counters 21. These usage counters 20 are used to monitor the use of the local occlusion counters 21 in the occlusion query cache 19. The use of these usage counters 20 will be discussed in more detail below.

The system can maintain plural local occlusion counters 21 concurrently in the occlusion query cache 19. In the present embodiment up to 8 local occlusion counters can be maintained in the occlusion query cache 19 at any one time.

The main memory 5 can similarly maintain plural "master" occlusion counters 22 concurrently. In the present embodiment, as many occlusion counters as there are active occlusion queries are maintained in the main memory 5.

In the present embodiment, when an occlusion query is to be processed, the graphics processing system will first identify this, e.g., because the relevant draw call descriptor indicates that the draw call relates to an occlusion query, and then an appropriate occlusion counter 22 will be allocated to the occlusion query in the main memory 5. When an occlusion query starts, a corresponding occlusion counter 22 is initialised in the main memory 5. In the present embodiment there can be multiple occlusion queries for a given render output (e.g. frame), and each primitive can only be associated with one counter. However, different primitives can point to the same counter, even when the render state is different. (Other arrangements would, of course, be possible.)

As well as the occlusion query counter 22 in the main memory 5, a corresponding local occlusion counter 21 is provided in the occlusion query cache 19 in the local memory 3 of the graphics processor 2.

The local occlusion counters 21 in the occlusion query cache 19 in the local memory 3 of the graphics processor 2 are provided or allocated 16, as shown in FIG. 2, at the rasterisation stage 11 when a fragment relating to the occlusion query is created. (The state information for or associated with the fragment will, e.g., indicate that it relates to an occlusion query (and which query it relates to).)

Thus, in the present embodiment, when a fragment related to an occlusion query is first created, it is first checked to see if a local counter 21 for that query is already within the occlusion query cache 19. If so, that local counter 21 for the query is used for the fragment in question.

If a local counter 21 for the query is not already present in the occlusion query cache 19, then a new local counter 21 must be provided and allocated in the occlusion query cache 19 for use for the occlusion query in question. To do this, it is first checked if there are free occlusion counters available in the local memory 3. If a free occlusion counter 21 is not available in the local memory 3, then the fragment creation is blocked until an occlusion counter is available. If an occlusion counter 21 is available, then it is allocated to the occlusion query.

A memory request is also sent to the occlusion counters 22 in the main memory 5 to load any previous counter value for the query from the occlusion counters 22 in the main memory 5.

The occlusion counters are allocated by software and any newly allocated local occlusion counter 21 in the occlusion query cache 19 is reset to zero before processing of the occlusion query starts.

Once a local occlusion counter 21 has been allocated to the occlusion query, then that occlusion counter can be used to count the results of the query, as is known in the art. Thus depending upon whether fragments relating to the query pass the appropriate early-Z/stencil 12 or late-Z/stencil 14 tests in the fragment processing pipeline 10, the occlusion counter 21 in the occlusion query cache 19 is incremented appropriately 17, 18. In the present embodiment, the occlusion test is based on whether a fragment (as it is being processed) passes Z (depth) and stencil tests. The system tries to perform the count at the early depth (Z) and stencil test stage 12, but falls back to counting at the late depth (Z) and stencil test stage 14 if necessary.

The system does not wait for the memory request to the "master" occlusion counters 22 in the main memory 5 to complete before processing the new fragments relating to the occlusion query and using the local occlusion counter 21 in the occlusion query cache 19. Instead, the local occlusion counter 21 in the occlusion query cache 19 is used to maintain a temporary value for the occlusion count until any previous value arrives from the master occlusion counter 22 in the main memory 5. When the previous value for the occlusion query arrives, it is then applied to the temporary value in the local occlusion counter 21 in the occlusion query cache 19, so that the local occlusion counter 21 in the occlusion query cache 19 then has the correct value.

The local occlusion counters 21 in the occlusion query cache 19 operate in the appropriate manner for the nature of the occlusion query that they are being used for. In the present embodiment, as shown in FIG. 2, the occlusion query test is based on whether a fragment (as it is being processed) passes Z (depth) and stencil tests.

Thus, in the case of an integer occlusion query, the counters count each fragment that passes the Z/stencil tests (i.e. are incremented by one each time a fragment that is associated with the query passes the Z/stencil tests).

In the case of a Boolean query, the counter has one value ("0") that indicates that no fragments have yet passed the Z/stencil tests, and is then changed to another value ("1"), when a fragment passes the Z/stencil tests (and then remains at that value irrespective of how many other fragments pass the Z/stencil test (if the counter is maintained after the first fragment passes the test)). Thus, in the case of Boolean occlusion queries, the occlusion counters can have two (and only two) values, one value (which in this embodiment is "0") while the occlusion query mechanism has not counted any fragment that has passed the occlusion test, and a second value (which in this embodiment is "1") once the occlusion query mechanism has counted a fragment that has passed the occlusion test. Each counter is set to "0" initially, but is changed to "1" when a fragment passes the occlusion test.

Other arrangements for the occlusion test, such as determining whether a fragment passes one or more of, and in an embodiment all of, a depth (Z) test, a stencil test, an alpha test, a scissor test and a frustrum visibility test, could be used if desired.

The occlusion query itself can be performed in any suitable and desired manner, for example, by occlusion testing "real" objects for a render output (e.g. complex objects (such as objects that are or will or could be made up of plural primitives) in a scene to be rendered), by injecting dummy or proxy test objects (e.g. bounding or bounded boxes (e.g. volumes) that represent complex objects (e.g. "proxy" representative boxes that are or have been generated for the complex objects)) into the stream of objects to be rendered, and/or by a combination of these techniques, etc., as is known in the art.

The usage counters 20 maintained in the occlusion query cache 19 are used to determine whether it is possible to write the value of a given local occlusion counter 21 in the occlusion query cache 19 back to the main memory 22 or not. In particular, in the case of integer occlusion queries, each local occlusion counter 21 in the occlusion query cache 19 has an associated usage counter 20 that is incremented when a fragment relating to the query enters the fragment pipeline 10 and is decremented when the fragment exits the fragment pipeline. In other words, the usage counters 20 maintain a count of how many fragments there are in the pipeline that relate to the occlusion query in question. When this count reaches zero, there will be no fragments in the pipeline 10 relating to the query, and so the local occlusion counter 21 in the occlusion query cache 19 can be written back to the occlusion counter 22 in the main memory 5 (and the local occlusion counter 21 in the occlusion query cache 19, e.g., then released for use for a new occlusion query).

Once the value of the local occlusion counter 21 in the occlusion query cache 19 has been written back to the occlusion counter 22 in the main memory 5 (and that occlusion query has otherwise been completed), the result of the query can be read from the occlusion counter 22 in the main memory 5 and used as desired and as appropriate (e.g. by an application (e.g. game) that is triggering the use of the graphics processor).

In the present embodiment, the results of the occlusion queries are used to modify the subsequent rendering process.

For example, the object of an occlusion query may comprise a complex object (such as an object that is or will or could be made up of plural primitives) in a scene to be rendered, or a bounding or bounded box (volume) that represents a or the complex object (e.g. a "proxy" representative "box" that is or has been generated for the complex object), and the results of an occlusion query for that object are then used to determine whether the object is visible and/or which parts of the object are visible. If it is determined that the complex object is not visible in a particular frame (or if the number of potentially visible fragments for the complex object fall below a threshold), then subsequent rendering operations in respect of that object are reduced or avoided.

In the present embodiment, if the occlusion count is or falls below a threshold value (i.e. the number of drawn fragments falls below a threshold), then the complex object is replaced with a bounding box that represents the complex object for the purposes of rendering the next frame. The bounding box is a simple representation of the complex object that is easier for the graphics processing system to process than the complex object that it represents.

In this case the bounding box is set to have the same z/s test as the complex object but a pass-through shader with rgb-writemask=off state (i.e. the state information for or associated with the bounding box is set so that the bounding box does not contribute to the render output). The bounding box is still subjected to an occlusion query.

If it is then determined that the bounding box is potentially visible in a subsequent frame (i.e. the occlusion count for the bounding goes above a given threshold (if the number of potentially visible fragments for the bounding box rises above a threshold)), then the bounding box is replaced with the complex object that it represents for the purposes of rendering the following frame, to make the complex object visible in the following frame.

This arrangement may be enhanced further by changing the size of the bounding box and/or by using other input sources (e.g. distance, etc) in addition to occlusion counters when deciding when to show (draw) or occlude an object, if desired, e.g. to further reduce the possibility of objects "popping" into and out of the render output.

Thus, the results of the occlusion queries are used to determine or predict when a part or parts (e.g. a complex object or objects) of a scene to be rendered will (or could) not be visible (i.e. occluded), and/or when the part or parts will (or could) be visible, in the render output. An occluded complex object is then replaced with a bounding box that represents the complex object (and vice-versa) when appropriate. Such arrangements allow the rendering process to proceed in a more efficient manner.

FIGS. 1 and 2 show the basic arrangement of an embodiment of the occlusion query implementation system in relation to a graphics processing system having a single graphics processing core. However, the technology described herein is equally applicable for use in multi-core architectures (i.e. in graphics processing systems that include multiple graphics processing cores that can operate in parallel). In an embodiment of such an arrangement, each graphics processing core will have an occlusion query cache arrangement as shown in FIG. 2, but the occlusion query caches of each separate graphics processing core will be configured to use occlusion counters in a shared main memory in an appropriate manner.

FIGS. 3 to 8 illustrate this, and show schematically embodiments for use with multi-core graphics processing systems. In these Figures, sharp-edged rectangles are used to represent hardware units, and rounded rectangles are used to represent software objects. Like reference numerals are used throughout these Figures for like features.

Figure 3:
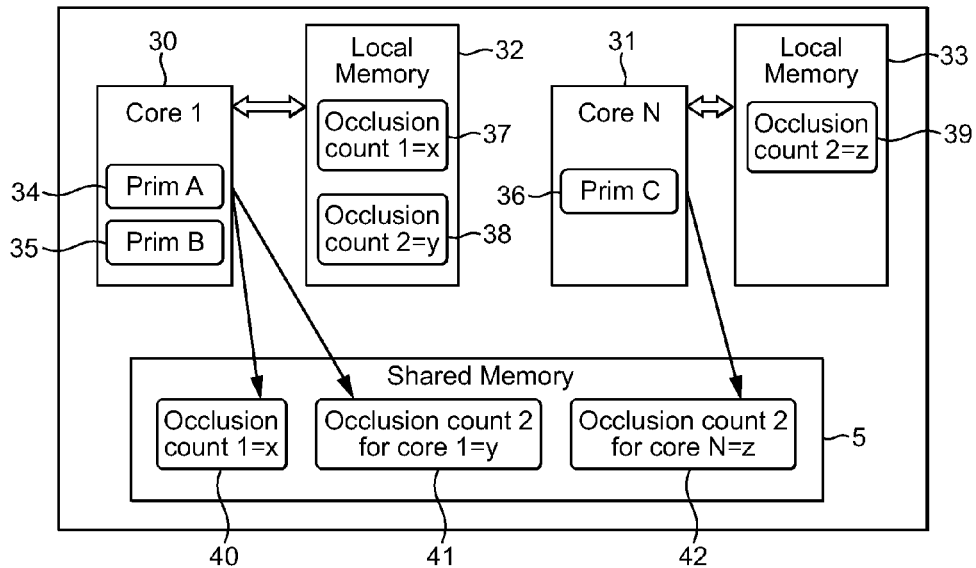
FIGS. 3 to 5 show schematically an embodiment for executing an integer occlusion query in a multi-core graphics processing system.
Figure 4:
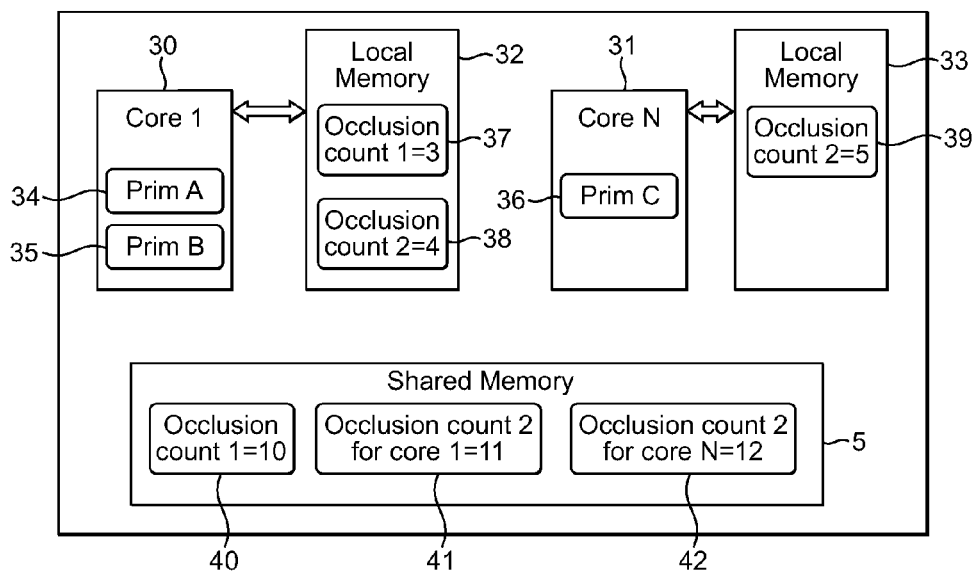
Figure 5:
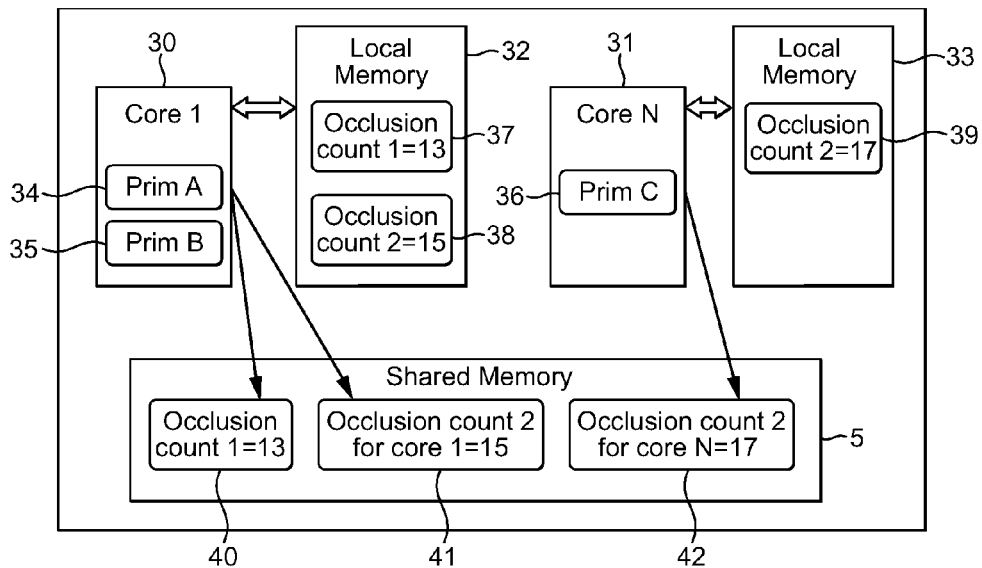
Figure 6:
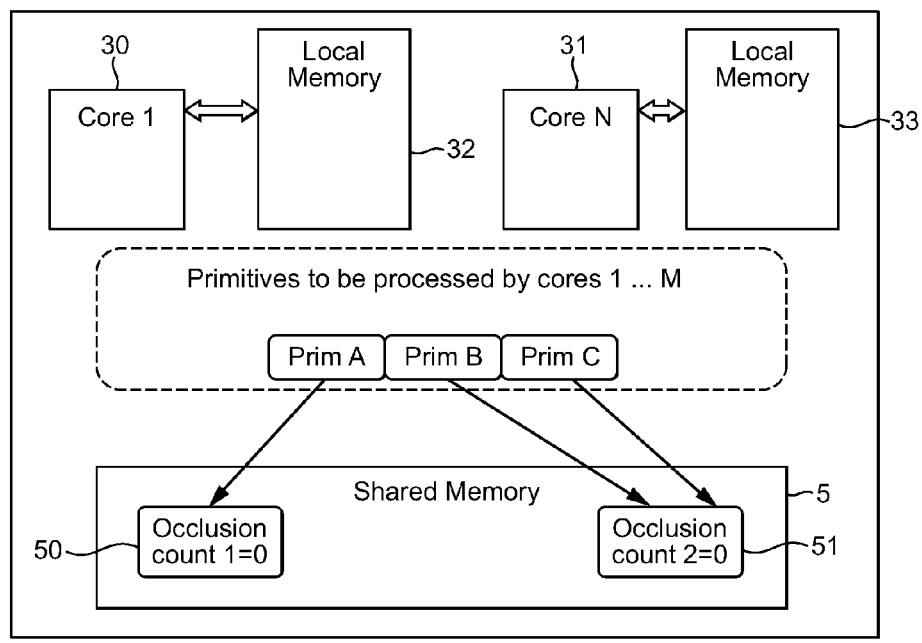
FIGS. 6 to 8 show schematically an embodiment for executing a Boolean occlusion query in a multi-core graphics processing system.
Figure 7:
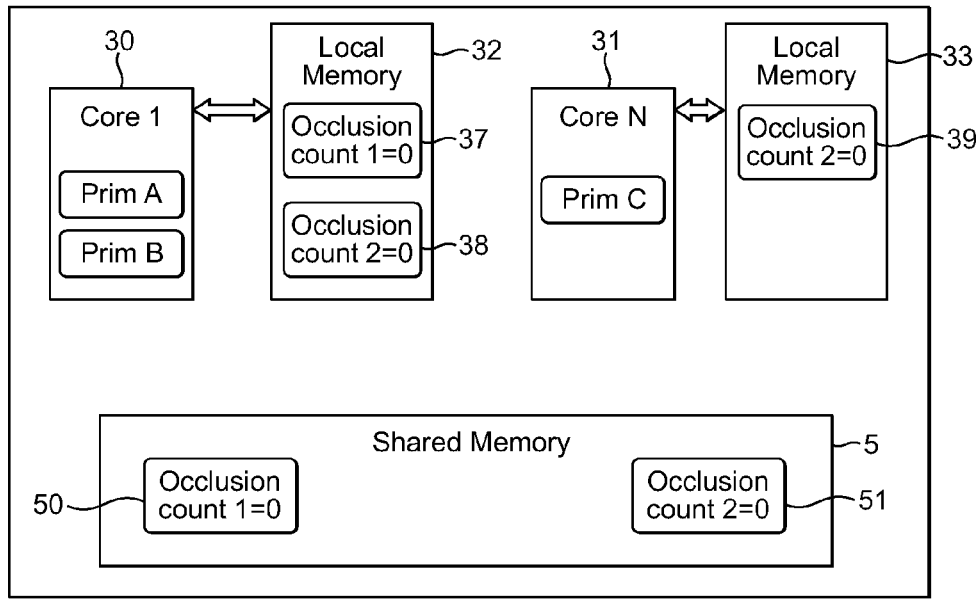
Figure 8:
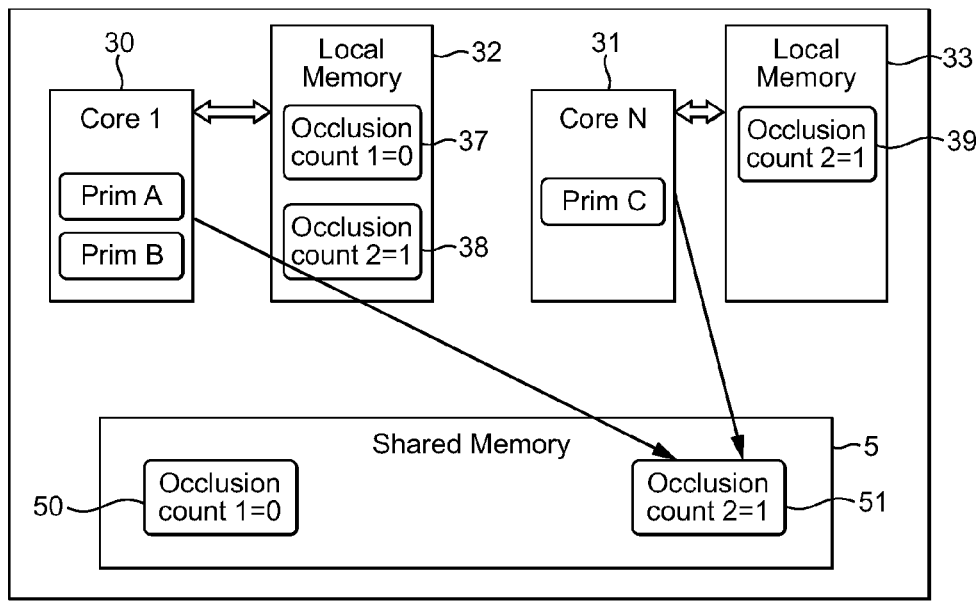

FIGS. 3 to 5 show an embodiment for executing an integer occlusion query, and FIGS. 6 to 8 show an embodiment for executing a Boolean occlusion query, in a multi-core system. As can be seen from these Figures, the arrangement differs depending upon whether the occlusion query is an integer query (i.e. a query for which the total number of graphics fragments that pass the query need to be counted), or a Boolean occlusion query (i.e. a query which should return true if any fragment in the query passes the occlusion test (i.e. is determined (potentially) to be visible)).

In the embodiments shown in these Figures it is assumed, by way of example, that there are three primitives to be processed, primitives A, B and C, and that primitive A is associated with a first occlusion query, whereas primitives B and C are associated with a second occlusion query. Also, as shown in these Figures, it is assumed that the primitives A, B and C are distributed between two graphics processing cores, 30, 31, such that the first core 30 processes primitives A and B, whereas the other core 31 processes primitive C.

(As will be appreciated by those skilled in the art, there will in practice typically be many more primitives relating to a given occlusion query than is shown in these Figures. These Figures show only three primitives for clarity. There may also be more than two processing cores, and the primitives may be distributed between the cores for processing as desired.)

In an embodiment for performing an integer occlusion query, as shown in FIG. 3, each graphics processing core 30, 31, has its own occlusion query cache in an associated local memory 32, 33, in which it maintains its own appropriate local occlusion counters. Also, as shown in FIG. 3, in this embodiment there is a separate occlusion counter for each different occlusion query in the shared main memory 5 for each respective graphics processing core.

Thus, if one assumes, as discussed above, and as shown in FIG. 3, that a primitive A relates to a first occlusion query, and primitives B and C relate to a second occlusion query, the first graphics processing core 30 will maintain a first local occlusion query counter 37 for the first occlusion query (in respect of primitive A) and a second local occlusion query occlusion counter 38 for the second occlusion query (in respect of primitive B), whereas the other graphics processing core 31 will maintain a local occlusion counter 39 for the second occlusion query (in respect of primitive C).

Similarly, as shown in FIG. 3, in the shared main memory 5, a first occlusion counter 40 is maintained for the first occlusion query for the first core 30, and then there are two occlusion counters maintained for the second occlusion query, a first occlusion counter 41 for the second occlusion query for the first graphics processing core 30, and a second occlusion counter 42 for the second occlusion query for the other graphics processing core 31.

FIG. 3 shows the situation where there has not been any previous count for the respective occlusion queries already stored in the shared memory 5. Thus in this case, when the primitives A, B and C fall to be processed, the respective occlusion counters will be allocated both in the shared memory 5 and the local memories 32, 33 for the graphics processing cores, and then the cores 30, 31 will simply count the number of fragments passing the occlusion tests and accumulate their respective local counters 37, 38, 39 in their respective local memories 32, 33.

Each local occlusion counter will also have an appropriate usage counter (as discussed above) associated with it (not shown), as these are integer occlusion queries. Once these usage counters indicate that there are no longer any fragments being processed relating to the respective occlusion counts, the respective occlusion counter values from the local memories 32, 33 can be written back to the occlusion counters in the shared memory 5 appropriately. (The local counters are written back to the main shared memory 5 when the usage counter for the respective local occlusion counter reaches zero. Any local occlusion counter that has a value zero is not written back.)

Once the local counter values have been written back to the shared memory 5, then the results can be read from the shared memory for use as appropriate. The different occlusion counts 41, 42 for the second occlusion query should be appropriately combined (e.g. accumulated) when this is done. This can be done as desired, e.g. in software.

FIG. 4 shows the situation for an integer occlusion query where there is already a count for the respective query stored in the shared memory 5. In this case, the respective local counters 37, 38, 39 for the cores 30, 31 are started in the local memories 32, 33 associated with the cores 30, 31, counting from zero, when the primitives relating to the queries come to be processed, and at the same time, requests are sent to the shared memory 5 for the existing count values.

Then, when the existing count values from the main memory 5 have been received, they are added to the appropriate local counter values in the local memories 32, 33. This is shown in FIG. 5 (which shows the original count values from the shared memory 5 added to the local count value from FIG. 4 in the local counters 37, 38, 39 in the local memories 32, 33).

FIG. 5 also shows the subsequent writing back of the summed counter values to the counters 40, 41, 42 in the shared memory 5. The existing counter values from the shared memory 5 are added to the new local counter values in the local memories 32, 33 before the sum is written back to the counters in the shared memory 5. Thus, a local counter value is only written back to the main memory 5 when the usage counter for the local counter reaches zero and any previous counter value from the main memory 5 has been loaded and added to it.

Although in the arrangements shown in FIGS. 3 to 5, a separate occlusion counter is maintained in the main memory 5 for a given integer occlusion query for each processing core that is handling that query, with a coherent memory system it may be possible to use the read/modify/write processes supported by that memory system to allow multiple cores to use the same counter in the main memory 5 for an integer occlusion query, if desired.

FIGS. 6 to 8 show an embodiment for executing a Boolean occlusion query in a multi-core graphics processing system. In this embodiment, the basic arrangement is the same as for the above embodiment illustrating an integer occlusion query in a multi-core graphics processing system. Thus again, as shown in these Figures, there are two graphics processing cores 30, 31, which each maintain their own local occlusion query caches in respective associated local memories 32, 33, and there is again "master" occlusion counters maintained in a shared, main memory 5.

Again, it will be assumed for the purposes of illustrating this embodiment, that there are three primitives to be processed, primitive A relating to a first occlusion query, and primitives B and C relating to a second occlusion query, with the first graphics processing core 30 processing primitives A and B and the second graphics processing core 31 processing primitive C.

However, there are some differences between the arrangement for processing a Boolean occlusion query in a multi-core system as compared to the above described process for implementing an integer occlusion query in a multi-core system, and these differences will now be described in more detail.

FIG. 6 shows the situation where the occlusion query first starts. The graphics processing system may identify this, for example, by seeing that the relevant draw call descriptor indicates that the draw call relates to a Boolean occlusion query. At this stage, the main, "master" occlusion counters are allocated to the occlusion query and initialised in the shared main memory 5. Thus, as shown in FIG. 6, a first "master" occlusion counter 50 is allocated and initialised in the shared main memory 5 for the first occlusion query that primitive A relates to, and a second "master" occlusion counter 51 is allocated and initialised in the shared main memory 5 for the second occlusion query that primitives B and C relate to.

It should be noted here that, in contrast to the above described arrangement for integer occlusion queries, both graphics processing cores 30 and 31 can share the same "master" occlusion counter 51 in the shared main memory 5 for the second occlusion query, irrespective of whether the shared main memory 5 is a coherent memory system or not. Thus, in the case of Boolean occlusion queries, different graphics processing cores processing the same occlusion query can, and in an embodiment do, share the same "master" occlusion counter for the query in the main, shared memory.

Once the "master" occlusion counters have been allocated and initialised in the shared, main memory 5, then as shown in FIG. 7, the appropriate local occlusion counters are allocated and initialised in the respective local memories of the graphics processing cores. Thus, as shown in FIG. 7, the first graphics processing core 30 initialises a first local occlusion query counter 37 for the first occlusion query (in respect of primitive A), and a second local occlusion query counter 38 for the second occlusion query (in respect of primitive B). Similarly, the other graphics processing core 31 initialises a local occlusion counter 39 for the second occlusion query (in respect of primitive C).

The local occlusion counters 37, 38, 39 operate as discussed above for the Boolean queries. Thus, when they are initialised, they are each set to "0", but are all changed to the value "1" when a fragment of the respective primitive (for the respective occlusion query) passes the Z and stencil tests. Furthermore, as soon as the local counter's value is changed to 1 (i.e. a fragment has passed the occlusion test), then the counter value is written back immediately to the "master" occlusion counter in the shared main memory 5. (Thus the graphics processing cores write the local counter values back to the shared main memory 5 whenever and as soon as the Boolean occlusion query becomes "true".) This is because once one fragment has passed the occlusion test, the Boolean query has been met.

FIG. 8 illustrates this and shows the Boolean query being met by fragments of both primitives A and C, such that both the core 30 and the core 31 will write back their local counter 38, 39 values for the second occlusion query to the master occlusion counter 51 for that query in the shared main memory 5. It should be noted here that as the two local counters 38, 39 are writing back the same value to the "master" counter 51 in the shared main memory 5, there will be no issues in relation to potential conflicts between the different counters attempting to write back to the master counter in the shared main memory 5 (since as all the writes will have the same value, the write-order between the different graphics processing cores is not important). To further facilitate this, any local Boolean occlusion counter values having the value "0" are not written back to the counters in the shared main memory 5.

As discussed above for the integer occlusion query operation, where a Boolean occlusion query is being executed and a master counter for that query already exists in the shared main memory 5 when a local counter is to be allocated to the query, then an appropriate read request is sent in order to load the value of the counter in the shared memory to the local counter. In this case, when the master counter value is received from the shared memory, the local counter value should be set accordingly, i.e. either to "0" to indicate that the occlusion query mechanism still has not counted any fragment that has passed the occlusion test, or to "1" where the occlusion query mechanism has counted a fragment that has passed the occlusion test.

In the present embodiment, it is also further checked whenever a new primitive relating to a given Boolean occlusion query is scheduled for processing, whether the Boolean occlusion query has already been met. This is because the Applicants have recognised that once a Boolean occlusion query has been met, there is then no need to process any further primitives in relation to the occlusion query itself (although the primitives may still need to be processed if they are intended otherwise to contribute to the render output or generate some other form of desired data, such as having side effects).

Thus, when a new primitive relating to a given Boolean occlusion query is scheduled for processing, it is determined whether the Boolean occlusion query has already been met, and if the Boolean occlusion query has already been met, then the render state for the primitive is checked to see if the shader state is intended to have side effects, and the colour, depth and stencil writes are enabled or not (i.e. it is intended for the primitive to contribute to the colour, depth and stencil buffers or not). If the render state indicates that the primitive is not intended to have side effects, and is not intended to write to any of the colour, depth and stencil buffers (i.e. colour, depth and stencil writes are all disabled), then the primitive is discarded and not processed. (Otherwise, the primitive is processed normally.) This avoids unnecessarily processing primitives that contribute solely to a Boolean occlusion query that has already been met.

Furthermore, if during the processing of a primitive, a given Boolean occlusion query is met, these checks are similarly made for the primitive in question, and if it is determined that the primitive relates to the Boolean occlusion query only, the rasteriser 11 is controlled to not produce any more fragments for the primitive (i.e. to stop any further processing of the primitive).

It would also be possible to stop the processing of fragments that are already in the fragment pipeline in these situations where the graphics processing system supports that.

It should be noted here that this stopping of processing or not processing of a primitive relating to a Boolean occlusion query can be triggered by a check of the occlusion counter value in the relevant occlusion query cache in local memory, and also by a check of any master occlusion counter for that occlusion query in the main memory. In the latter case, this could involve a delay while the master counter value is retrieved from the main memory, but once that value is retrieved and the local counter is set to the appropriate value indicating that the Boolean occlusion query has been met, then the processing can be stopped or aborted, as appropriate.

The latter could in particular be the case where, for example, a new tile falls to be processed and includes a primitive for a draw call (Boolean occlusion query) that has already been met through the processing of a previous tile. In this case, when the graphics processing system reads the draw call descriptor in relation to the new tile, it will then read in the Boolean occlusion query value from the master counter in the main memory and determine whether to continue processing primitives for the draw call accordingly.

Other variations and modifications to the present embodiments and the technology described herein would be possible. For example, the occlusion query counters could be attached to the primitives instead of the rendering state, with a post-processing step then being used, for example, to add together the counters from different primitives.

It can be seen from the above that the technology described herein, in embodiments at least, provides a system for carrying out occlusion queries in graphics architectures in a more efficient manner. For example, multiple occlusion queries can be handled and started simultaneously, and without the need to load previous occlusion counter values from main memory. In the case of Boolean occlusion queries, the unnecessary processing of graphics entities relating to those queries can be avoided. This can help to save power, for example. The technology described herein also allows, for example, the processing of occlusion queries to be started earlier in tiling systems. Indeed, as discussed above, the technology described herein is particularly advantageous for tile-based graphics processing systems.

This is achieved in embodiments at least, by maintaining local versions of occlusion counters in a local memory associated with a graphics processing core, and, for example, identifying when a Boolean query has been met and then determining whether any future processing relating to that query can be stopped.

The foregoing detailed description has been presented for purposes of illustration and description. It is not intended to be exhaustive or to limit the technology described herein to the precise form disclosed. Many modifications and variations are possible in light of the above teaching. The described embodiments were chosen in order to best explain the principles of the technology described herein and its practical application to thereby enable others skilled in the art to best utilize the technology described herein in various embodiments and with various modifications as are suited to the particular use contemplated. It is intended that the scope of the technology described herein be defined by the claims appended hereto.

The invention claimed is:

1. A method of performing occlusion queries in a graphics processing system, the method comprising:
when an occlusion query is to be performed:
allocating an occlusion counter for the occlusion query in a main memory of or associated with the graphics processing system;
providing in a local memory of or associated with the graphics processing system, a local occlusion counter to be used for the respective occlusion query; and
using the local occlusion counter in the local memory to count results of the occlusion query; and
once the local occlusion counter in the local memory has counted results of the occlusion query, writing the counter value for the local occlusion counter from the local memory to the allocated occlusion counter for the occlusion query in a main memory of or associated with the graphics processing system.

2. The method of claim 1, comprising:
when a new occlusion counter in the local memory is allocated to an occlusion query, sending a request to the main memory to load any previous counter value for that occlusion query into the local memory.

3. The method of claim 2, comprising starting the new occlusion count in the local memory without waiting for the main memory request to complete.

4. The method of claim 1, comprising:
monitoring the use of each occlusion query counter in the local memory, and if it is determined that an occlusion counter is not currently in use, writing its value back to main memory, and then making the local counter available for re-allocation to another occlusion query.

5. The method of claim 1, comprising:
in the case of a Boolean occlusion query, once the query has been met, writing the local occlusion counter value to main memory, and then making the occlusion counter in the local memory available for use for other occlusion queries.

6. The method of claim 1, wherein:
the graphics processing system includes multiple processing cores, each able to operate on the same occlusion query, and comprising in the case of an integer occlusion query, providing each processing core with its own, separate set of local occlusion counters, and its own count value and counter for a given integer occlusion query in the main memory.

7. The method of claim 1, wherein the graphics processing system includes multiple processing cores and the multiple processing cores share a single counter in the main memory for a given Boolean occlusion query.

8. The method of claim 1, comprising:
if a graphics entity to be processed is associated with a Boolean occlusion query, once the query has been met, determining whether the entity still needs otherwise to be processed or not, and if it does not, stopping processing of the graphics entity.

9. The method of claim 1, wherein the graphics processing system is a tile-based graphics processing system.

10. A graphics processing system comprising:
at least one graphics processing core;
a local memory associated with the at least one graphics processing core; and
a main memory of or associated with the graphics processing system; and wherein
the graphics processing system is configured to, when an occlusion query is to be performed:
allocate an occlusion counter for the occlusion query in the main memory of or associated with the graphics processing system;
provide in the local memory associated with the at least one graphics processing core, a local occlusion counter to be used for the respective occlusion query;
use the local occlusion counter in the local memory to count results of the occlusion query; and
once the local occlusion counter in the local memory has counted results of the occlusion query, write the counter value for the local occlusion counter from the local memory to the allocated occlusion counter for the occlusion query in the main memory of or associated with the graphics processing system.

11. The system of claim 10, wherein the graphics processing system is configured to, when a new occlusion counter in the local memory is allocated to an occlusion query, send a request to the main memory to load any previous counter value for that occlusion query into the local memory.

12. The system of claim 11, wherein the graphics processing system is configured to start the new occlusion count in the local memory without waiting for the main memory request to complete.

13. The system of claim 10, wherein the graphics processing system is configured to monitor the use of each occlusion query counter in the local memory, and to, if it is determined that an occlusion counter is not currently in use, write its value back to main memory, and then make the local counter available for re-allocation to another occlusion query.

14. The system of claim 10, wherein the graphics processing system is configured to, in the case of a Boolean occlusion query, once the query has been met, write the local occlusion counter value to main memory, and then make the occlusion counter in the local memory available for use for other occlusion queries.

15. The system of claim 10, wherein:
the graphics processing system includes multiple processing cores, each able to operate on the same occlusion query, and the graphics processing system is configured to, in the case of an integer occlusion query, provide each processing core with its own, separate set of local occlusion counters, and its own count value and counter for a given integer occlusion query in the main memory.

16. The system of claim 10, wherein the graphics processing system includes multiple processing cores and the multiple processing cores share a single counter in the main memory for a given Boolean occlusion query.

17. The system of claim 10, wherein the graphics processing system is configured to, if a graphics entity to be processed is associated with a Boolean occlusion query, once the query has been met, determine whether the entity still needs otherwise to be processed or not, and if it does not, stop processing of the graphics entity.

18. The system of claim 10, wherein the graphics processing system is a tile-based graphics processing system.

19. One or more non-transitory computer readable storage devices having computer readable code embodied on the computer readable storage device for programming one or more data processors to perform a method of performing occlusion queries in a graphics processing system, the method comprising:
when an occlusion query is to be performed:
allocating an occlusion counter for the occlusion query in a main memory of or associated with the graphics processing system;
providing in a local memory of or associated with the graphics processing system, a local occlusion counter to be used for the respective occlusion query; and
using the local occlusion counter in the local memory to count results of the occlusion query; and
once the local occlusion counter in the local memory has counted results of the occlusion query, writing the counter value for the local occlusion counter from the local memory to the allocated occlusion counter for the occlusion query in a main memory of or associated with the graphics processing system.

* * * * *